(12) United States Patent
Lozhkin et al.

(10) Patent No.: US 11,689,229 B2
(45) Date of Patent: Jun. 27, 2023

(54) WIRELESS COMMUNICATION DEVICE AND DISTORTION COMPENSATION METHOD

(71) Applicant: FUJITSU LIMITED, Kawasaki (JP)

(72) Inventors: Alexander Nikolaevich Lozhkin, Kawasaki (JP); Tomoya Ota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 17/523,950

(22) Filed: Nov. 11, 2021

(65) Prior Publication Data

US 2022/0345162 A1    Oct. 27, 2022

(30) Foreign Application Priority Data

Apr. 26, 2021    (JP) .............................. JP2021-074304

(51) Int. Cl.
*H04B 1/04*    (2006.01)
*H04B 7/06*    (2006.01)
*H03F 1/32*    (2006.01)

(52) U.S. Cl.
CPC ......... *H04B 1/0475* (2013.01); *H04B 1/0483* (2013.01); *H04B 2001/0425* (2013.01)

(58) Field of Classification Search
None
See application file for complete search history.

(56) References Cited

U.S. PATENT DOCUMENTS

| | | | | |
|---|---|---|---|---|
| 9,337,782 B1 * | 5/2016 | Mauer | ............... | H04L 25/03343 |
| 9,787,335 B1 * | 10/2017 | Jeong | ................... | H04B 1/0475 |
| 11,018,925 B1 * | 5/2021 | Chang | ............... | H04L 25/03343 |

(Continued)

FOREIGN PATENT DOCUMENTS

| | | |
|---|---|---|
| JP | 2016-100835 A | 5/2016 |
| JP | 2019-154024 A | 9/2019 |
| WO | WO-2021217673 A1 * | 11/2021 |

OTHER PUBLICATIONS

Lei Ding et al., "A Robust Digital Baseband Predistorter Constructed Using Memory Polynomials" IEEE Transactions on Communications, vol. 52, No. 1, pp. 159-165, Jan. 2004 (Total 7 pages).

(Continued)

*Primary Examiner* — Pablo N Tran
(74) *Attorney, Agent, or Firm* — Fujitsu Patent Center (57) ABSTRACT

A wireless communication device includes: a plurality of power amplifiers provided for a plurality of respective antenna elements, each of the power amplifiers amplifying a signal; a distortion compensation unit that executes distortion compensation of a transmission signal by using an inverse function corresponding to nonlinear distortion generated in the power amplifiers; and a controller that operates by switching a first mode and a second mode, the first mode setting individual inverse functions for the respective power amplifiers in the distortion compensation unit and updating coefficients of the individual inverse functions, the second mode suspending the update of the coefficients of the individual inverse functions and setting, in the distortion compensation unit, an integrated inverse function acquired by performing weighted addition of the individual inverse functions.

7 Claims, 5 Drawing Sheets

(56) References Cited

U.S. PATENT DOCUMENTS

2018/0013456 A1\* 1/2018 Miyazaki .............. H03F 1/3247
2019/0273541 A1 9/2019 Ohshima et al.

OTHER PUBLICATIONS

Mahmoud Abdelaziz et al., "Digital Predistortion for Hybrid MIMO Transmitters", IEEE Journal of Selected Topics in Signal Processing, vol. 12, No. 3, pp. 445-454 (Total 10 pages).

Nuutti Tervo et al., "Digital Predistortion of Amplitude Varying Phased Array Utilising Over-the-Air Combining", Faculty of Information Technology and Electrical Engineering (ITEE), University of Oulu, Finland (Total 4 pages).

Sangil Lee et al., "Digital Predistortion for Power Amplifiers in Hybrid MIMO Systems with Antenna Subarrays", 2015 IEEE (Total 5 pages).

Hsin-Hung Chen et al., "Joint Polynomial and Look-Up-Table Predistortion Power Amplifier Linearization", IEEE Transactions on Circuits and Systems, II: Express Briefs, vol. 53, No. 8, Aug. 2006 (Total 5 pages).

\* cited by examiner

WIRELESS COMMUNICATION DEVICE AND DISTORTION COMPENSATION METHOD

CROSS-REFERENCE TO RELATED APPLICATION

This application is based upon and claims the benefit of priority of the prior Japanese Patent Application No. 2021-074304, filed on Apr. 26, 2021, the entire contents of which are incorporated herein by reference.

FIELD

The embodiment discussed herein is related to a wireless communication device and a distortion compensation method.

BACKGROUND

Recently, from the viewpoint of reducing the size and operational cost of transmission devices as well as environmental issues and the like, there is an increasing need for power amplifiers that operates with high efficiency. When operating power amplifiers with high efficiency, input power is not linearly amplified and nonlinear distortion is generated in an area with a relatively large input power. Therefore, there may be a case of using an amplification method employing digital predistortion that gives in advance, to a transmission signal, distortion exhibiting an inverted characteristic of the nonlinear distortion generated in the power amplifiers. The distortion given in advance to the transmission signal in digital predistortion is also called a distortion compensation coefficient, which is read from a lookup table or calculated by using a polynomial. The distortion compensation coefficient is updated appropriately so as to sufficiently compensate the nonlinear distortion that fluctuates in accordance with the environment such as temperatures, for example.

In the meantime, in order to improve the communication system capacity by reducing interference with those other than the destination of the transmission signals, beamforming for forming a directional beam may be performed. When performing beamforming, a phase difference is set for the signals transmitted from a plurality of antenna elements configuring an array antenna. A phase shifter is provided to each of the antenna elements to control the phase of the signals, for example, and the phase-controlled signals are amplified by the power amplifiers corresponding to the respective antenna elements.

It is proposed to apply digital predistortion collectively for the transmission signals even in the case where the power amplifier is provided to each of the antenna elements as described above. That is, it is discussed to compensate the distortion of the transmission signal with the distortion compensation coefficient, demultiplex the transmission signal and amplify the demultiplexed transmission signals by the power amplifiers of the respective antenna elements to be transmitted therefrom. In this case, update of the distortion compensation coefficient is executed by following methods, for example.

The first method is to multiplex feedback signals fed back from the antenna elements and update the distortion compensation coefficient such that the error between the multiplexed feedback signal and the transmission signal becomes small. For updating the distortion compensation coefficient, Least Means Square (LMS) algorithm is used, for example.

The second method is to switch in terms of time the feedback signals fed back from the antenna elements to calculate the error with respect to the transmission signal, and update the distortion compensation coefficient such that the error becomes small. In this case, the distortion compensation coefficient is also updated by using the LMS algorithm, for example.

Patent Document 1: Japanese Laid-open Patent Publication No. 2019-154024

Patent Document 2: Japanese Laid-open Patent Publication No. 2016-100835

Non-Patent Document 1: S. Lee et al., "Digital Predistortion for Power Amplifiers in Hybrid MIMO Systems with Antenna Subarrays", 2015 IEEE VTC, May 2015

However, with the update of the distortion compensation coefficient described above, there may be a case where the distortion compensation coefficient is not updated appropriately so that the nonlinear distortion generated in the transmission signal at the power amplifier is not sufficiently compensated.

Specifically, when multiplexing the feedback signals from the antenna elements, the update accuracy of the distortion compensation coefficient based on the multiplexed feedback signal is poor unless the electrical lengths of the feedback paths are strictly consistent. That is, when the electrical lengths of the feedback paths vary, a phase difference, a delay time difference, and a gain difference are generated in the feedback signals on the respective feedback paths so that the feedback signals are not multiplexed appropriately. As a result, accuracy of the distortion compensation coefficient to be updated based on the error between the feedback signal and the transmission signal is deteriorated.

When the feedback signals from the antenna elements are switched in terms of time, there is no issues caused due to the phase difference, the delay time difference, and the gain difference of the feedback signals. However, the feedback signals whose error with respect to the respective transmission signals is acquired are the feedback signals of different timings for the respective antenna elements. Therefore, it is not possible to acquire the error between the transmission signals and the feedback signals of the same timing for all of the power amplifiers, so that the calculation accuracy of the distortion compensation coefficient acquired by the LMS algorithm, for example, is deteriorated.

Thus, it is considered to use only a feedback signal from one of the antenna elements to calculate the error between the feedback signal and the transmission signal, and update the distortion compensation coefficient such that the error thereof becomes small. However, even though it is possible in this case to effectively compensate the nonlinear distortion in the power amplifier that outputs the feedback signal, it is not possible to sufficiently compensate the nonlinear distortion in other power amplifiers. Therefore, it is difficult to sufficiently suppress the adjacent channel leakage ratio (ACLR) of all of the power amplifiers.

SUMMARY

According to an aspect of an embodiment, a wireless communication device includes: a plurality of power amplifiers provided for a plurality of respective antenna elements, each of the power amplifiers amplifying a signal; a distortion compensation unit that executes distortion compensation of a transmission signal by using an inverse function corresponding to nonlinear distortion generated in the power amplifiers; and a controller that operates by switching a first mode and a second mode, the first mode setting individual inverse functions for the respective power amplifiers in the distortion compensation unit and updating coefficients of the individual inverse functions, the second mode suspending the update of the coefficients of the individual inverse functions and setting, in the distortion compensation unit, an integrated inverse function acquired by performing weighted addition of the individual inverse functions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Note that the present invention is not limited by the embodiment.

Figure 1:
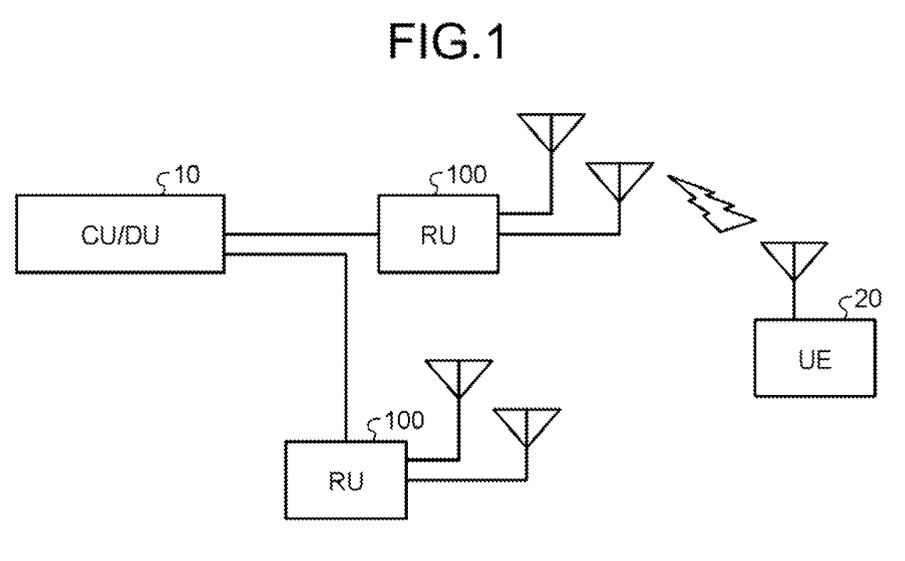
FIG. 1 is a diagram illustrating an example of a communication system according to an embodiment.

FIG. 1 is a diagram illustrating an example of a communication system according to the embodiment. In the communication system illustrated in FIG. 1, a plurality of radio units (RUs) 100 are connected to a central unit/distributed unit (CU/DU) 10, and the RUs 100 and user equipment (UE) 20 communicate wirelessly.

The CU/DU 10 is a device that executes baseband processing on signals, which encodes information to generate transmission baseband signals and transmit the signals to the RUs 100, and decodes reception baseband signals received from the RUs 100, for example. The CU/DU 10 may be configured by being separated into a CU and a DU.

The RU 100 is connected to the CU/DU 10 by wire. The RU 100 applies wireless transmission processing on the transmission baseband signal generated by the CU/DU 10, and applies wireless reception processing on the reception signal from UE 20 to generate the reception baseband signal and transmits it to the CU/DU 10. Furthermore, the RU 100 includes a plurality of antenna elements and, when having wireless communication with the UE 20, performs beamforming by giving an antenna weight to each of the antenna elements. Moreover, the RU 100 executes digital predistortion for compensating the nonlinear distortion generated in the power amplifier provided to each of the antenna elements. With digital predistortion, inverse functions of the nonlinear distortion generated in the respective power amplifiers are linearly combined, and the distortion of the transmission signals is compensated by the linearly combined inverse function. The configuration and operations of the RU 100 will be described in detail later.

The UE 20 is a user terminal device such as a mobile phone or a smartphone, and has wireless communication with the RU 100.

Figure 2:
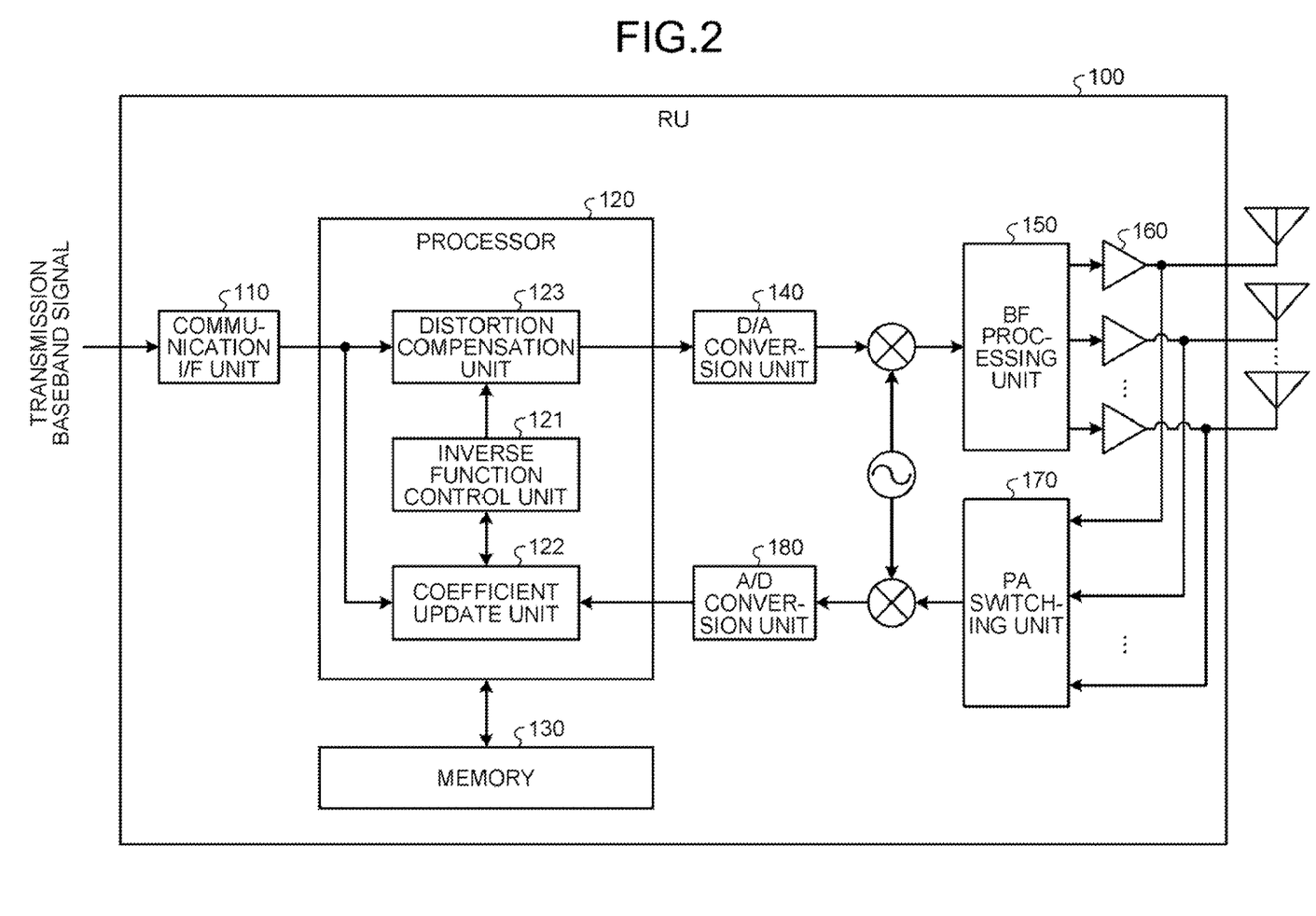
FIG. 2 is a block diagram illustrating a configuration of an RU according to the embodiment.

FIG. 2 is a block diagram illustrating the configuration of the RU 100 according to the embodiment. The RU 100 illustrated in FIG. 2 includes a communication interface unit (abbreviated as "communication I/F unit" hereinafter) 110, a processor 120, a memory 130, a digital/analog (D/A) conversion unit 140, a beamforming processing unit (abbreviated as "BF processing unit" hereinafter) 150, power amplifiers (PAs) 160, a PA switching unit 170, and an analog/digital (A/D) conversion unit 180. In FIG. 2, the processing units associated with the processing for transmitting the signals to the UE 20 are illustrated while the processing units associated with the processing for receiving the signals from the UE 20 are not illustrated.

The communication I/F unit 110 is an interface connected to the CU/DU 10 by wire, and transmits/receives baseband signals to/from the CU/DU 10. Specifically, the communication I/F unit 110 receives the transmission baseband signal transmitted from the CU/DU 10, and transmits the reception baseband signal to the CU/DU 10.

The processor 120 includes a central processing unit (CPU), a field programmable gate array (FPGA), a digital signal processor (DSP), and the like, for example, and performs integral control of the entire RU 100. Specifically, the processor 120 includes an inverse function control unit 121, a coefficient update unit 122, and a distortion compensation unit 123.

The inverse function control unit 121 controls the inverse functions used for the distortion compensation performed by the distortion compensation unit 123. An inverse function is a function that applies an inverse transformation of the nonlinear distortion generated in a PA 160, and it is expressed by a lookup table or a polynomial. The inverse function control unit 121 operates by switching two modes, which are a learning mode and a linear combination mode, and sets the inverse function in the distortion compensation unit 123 in each of these modes. Specifically, in the learning mode, the inverse function control unit 121 sequentially sets individual inverse functions corresponding to the respective PAs 160 in the distortion compensation unit 123. That is, in order to learn the individual inverse functions regarding the respective PAs 160, the inverse function control unit 121 sets individual inverse functions regarding the respective PAs 160 in the distortion compensation unit 123 to execute the distortion compensation using the individual inverse functions.

An individual inverse function "$F_i^{-1}(x)$" regarding the i-th PA 160 can be expressed by the following equation (1), where a transmission baseband signal at discrete time "n" is "x(n)".

$$F_i^{-1}(x) = \sum_{q=0}^{Q} x(n-q) \sum_{k=1}^{K} a_{i,kq} \cdot |x(n-q)|^{k-1} \quad (1)$$

Note that "Q" in the equation (1) is a memory depth, and "K" is an order of the nonlinear distortion. Furthermore, "$a_{i,kq}$" is the coefficient updated in the learning mode. In the learning mode, the inverse function control unit 121 sets the individual inverse function expressed in the above equation (1) for each of the PAs 160 in the distortion compensation unit 123.

Furthermore, in the linear combination mode, the inverse function control unit 121 calculates the weights for the respective PAs 160 based on the gains of the respective PAs 160, and linearly combines the individual inverse functions regarding the respective PAs 160 by using the calculated weights to derive an integrated inverse function used for final distortion compensation. Then, the inverse function control unit 121 sets the integrated inverse function for the distortion compensation in the distortion compensation unit 123 to execute the distortion compensation of the transmission baseband signal.

Where the weight of the i-th PA 160 is "$k_i$", the integrated inverse function "$F^{-1}$" for compensating the nonlinear distortion in M-pieces of PAs 160 can be expressed by the following equation (2).

$$F^{-1} = \sum_{i=1}^{M} k_i \cdot F_i^{-1} \qquad (2)$$

In the equation (2), the weight $k_i$ is a value based on the gain of the i-th PA 160 and satisfies the following condition.

$$\sum_{i=1}^{M} k_i = 1$$

Furthermore, "$Fi^{-1}$" indicates the individual inverse function regarding the i-th PA 160, and "M" indicates the number of antenna elements (that is, the number of PAs 160). Therefore, the integrated inverse function "$F^{-1}$" for the distortion compensation can be acquired by performing weighted addition of the individual inverse functions "$Fi^{-1}$" of the respective PAs 160.

The coefficient update unit 122 updates the coefficient of the individual inverse function in the learning mode of the inverse function control unit 121. Specifically, the coefficient update unit 122 updates the coefficient of the individual inverse function by using the LMS algorithm, for example, such that the error between the feedback signal from one of the PAs 160 and the transmission baseband signal becomes small.

In the learning mode of the individual inverse function regarding the i-th PA 160, the coefficient update unit 122 updates the coefficient "$a_{i,kq}$" by using the following equation (3), for example.

$$a_{i,kq}(j+1) = a_{i,kq}(j) + \mu_i \cdot \varepsilon_i(n) \cdot x^*(n) \qquad (3)$$

In the equation (3), "$\mu_i$" is a step size, and "$\varepsilon_i(n)$" indicates the error between the feedback signal from the i-th PA 160 and the transmission baseband signal. Furthermore, "$x^*(n)$" is a complex conjugate of the transmission baseband signal x(n).

Note that, in the linear combination mode of the inverse function control unit 121, the coefficient update unit 122 suspends update of the coefficient of the individual inverse function.

The distortion compensation unit 123 executes the distortion compensation of the transmission baseband signal by using the inverse function set by the inverse function control unit 121. That is, in the learning mode of the inverse function control unit 121, the distortion compensation unit 123 executes the distortion compensation of the transmission baseband signal by using the individual inverse function (the equation (1)) regarding one of the PAs 160. Furthermore, in the linear combination mode of the inverse function control unit 121, the distortion compensation unit 123 executes the distortion compensation of the transmission baseband signal by using the integrated inverse function (the equation (2)) for the distortion compensation. Then, the distortion compensation unit 123 outputs, to the D/A conversion unit 140, a distortion compensated signal acquired after executing the distortion compensation.

The memory 130 includes a random access memory (RAM), a read only memory (ROM), and the like, for example, and stores various kinds of information when the processing is executed by the processor 120.

The D/A conversion unit 140 performs D/A conversion on the distortion compensated signal output from the distortion compensation unit 123. An analog distortion compensated signal acquired by the D/A conversion is upconverted by an upconverter to be a transmission signal of a radio frequency.

The BF processing unit 150 sets a phase difference for the signals of the respective antenna elements by giving the antenna weights of the respective antenna elements to the transmission signals to perform beamforming for controlling the directions of directional beams. Then, the BF processing unit 150 outputs the signals of the antenna elements to the PAs 160 of the respective antenna elements.

The PA 160 is provided to each of the antenna elements, and amplifies the signal of the corresponding antenna element. The signal amplified by the PA 160 is transmitted from the corresponding antenna element and also fed back to the PA switching unit 170. Furthermore, at the time of amplification executed by the PA 160, nonlinear distortion in accordance with the power of the signal is generated. Note, however, that the nonlinear distortion is suppressed in a case where distortion compensation of the transmission baseband signal is executed by the distortion compensation unit 123.

The PA switching unit 170 switchably outputs the feedback signals fed back from the PAs 160 of the respective antenna elements. Specifically, in the learning mode of the inverse function control unit 121, the PA switching unit 170 outputs the feedback signals from the PAs 160 for a prescribed time each. The feedback signals output from the PA switching unit 170 are downconverted by a downconverter to be feedback signals of a baseband frequency.

The A/D conversion unit 180 performs A/D conversion on the downconverted feedback signals. Then, the A/D conversion unit 180 outputs the digital feedback signals to the coefficient update unit 122.

Figure 3:
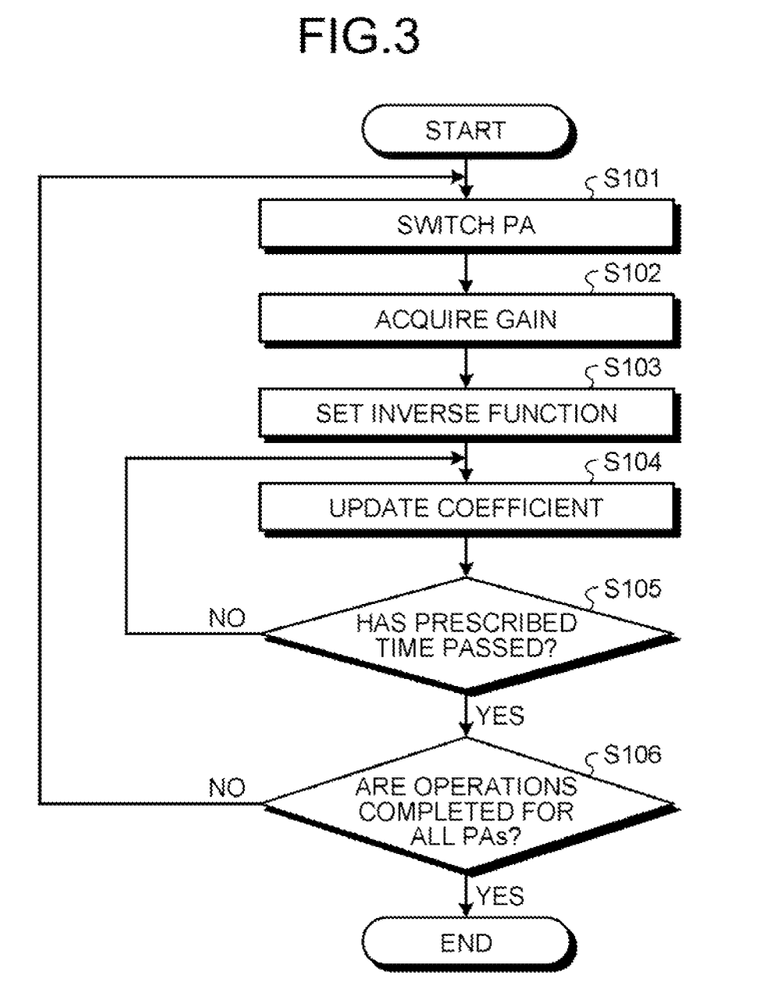
FIG. 3 is a flowchart illustrating operations in a learning mode.

Next, operations of the RU configured in the manner described above will be described separately for the learning mode and the linear combination mode of the inverse function control unit 121. FIG. 3 is a flowchart illustrating the operations of the inverse function control unit 121 in the learning mode.

In the learning mode, the PA switching unit 170 switches the PA 160 as the output source of the feedback signal so as to output the feedback signal from one of the PAs 160 (step S101). Herein, switching is performed to output the feedback signal of the first PA 160. Thereby, the feedback signal from the first PA 160 is fed back to the processor 120.

Furthermore, when the PA switching unit 170 switches the PA 160 as the output source of the feedback signal, the inverse function control unit 121 acquires the gain of the switched PA 160 (step S102). At the same time, the inverse function control unit 121 sets the individual inverse function corresponding to the switched PA 160 in the distortion compensation unit 123 (step S103). That is, it is set to execute distortion compensation by the individual inverse function that applies an inverse transformation of the nonlinear distortion generated in the first PA 160. The individual inverse function may be expressed by using a lookup table that stores the distortion compensation coefficient in association with the power of the transmission baseband signal or may be expressed by using a polynomial that calculates the distortion compensated signal from the transmission baseband signal.

In such a state, when the transmission baseband signal is received by the communication I/F unit 110, the distortion compensation unit 123 executes distortion compensation of the transmission baseband signal by the individual inverse function corresponding to the first PA 160. Then, the distortion compensated signal is D/A converted and upconverted, and then amplified by each of the PAs 160, and transmitted from the antenna elements. Furthermore, the signals amplified by the respective PAs 160 are fed back to the PA switching unit 170, and the signal amplified by the first PA 160 is output from the PA switching unit 170.

The feedback signal from the first PA 160 is downconverted and A/D converted, and input to the coefficient update unit 122. Then, the coefficient update unit 122 updates the coefficient of the individual inverse function corresponding to the first PA 160 (step S104). Specifically, by using the LMS algorithm expressed by the equation (3), for example, a new coefficient "$a_{1,kq}(j+1)$" is calculated from the current coefficient "$a_{1,kq}(j)$" so as to reduce the error $\varepsilon_1(n)$ between the transmission baseband signal and the feedback signal from the first PA 160. The calculated new coefficient is notified to the inverse function control unit 121, and the coefficient of the individual inverse function set in the distortion compensation unit 123 is updated by the inverse function control unit 121. This enables the distortion compensation unit 123 to execute the distortion compensation by the individual inverse function with the new coefficient.

When the coefficient of the individual inverse function is updated in the manner described above, the inverse function control unit 121 counts the time from the switching of the PA 160 as the output source of the feedback signal and determines whether a prescribed time has passed after the PA 160 is switched (step S105). When it is determined as a result that the prescribed time has not passed (No at step S105), the coefficient of the individual inverse function regarding the first PA 160 is continued to be updated (step S104). In the meantime, when the prescribed time has passed after the PA 160 is switched (Yes at step S105), it is determined that the coefficient of the individual inverse function regarding the PA 160 has been updated for a sufficient time and converged. Then, the individual inverse function with the converged coefficient is associated with the identification information of the PA 160 and stored in the memory 130 by the inverse function control unit 121. At this time, the information regarding the gain of the PA 160 is also stored in the memory 130.

Furthermore, when the coefficient of the individual inverse function regarding the current PA 160 is updated sufficiently, it is determined whether update of the coefficients of the individual inverse functions are completed for all of the PAs 160 (step S106). When it is determined as a result that there is a PA 160 whose coefficient of the individual inverse function has not been updated (No at step S106), the PA switching unit 170 switches the output source of the feedback signal to a next PA 160 (step S101). Then, the coefficient of the individual inverse function regarding the switched PA 160 is updated in the same manner.

In the meantime, when update of the coefficients of the individual inverse functions is completed for all of the PAs 160 (Yes at step S106), it is determined by the inverse function control unit 121 that the learning mode is completed. That is, the coefficients of the individual inverse functions regarding all of the PAs 160 are sufficiently updated and the individual inverse functions as well as the gains corresponding to the respective PAs 160 are stored in the memory 130, thereby completing the learning mode. Then, the inverse function control unit 121 shifts to the linear combination mode.

Figure 4:
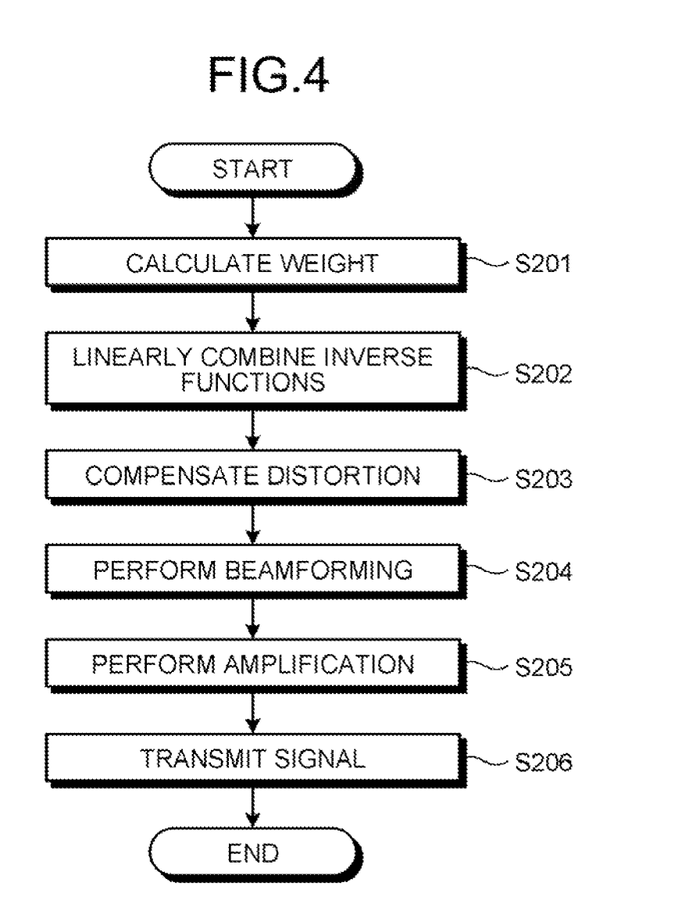
FIG. 4 is a flowchart illustrating operations in a linear combination mode.

FIG. 4 is a flowchart illustrating operations of the inverse function control unit 121 in the linear combination mode.

In the linear combination mode, the inverse function control unit 121 reads out the gain of each of the PAs 160 from the memory 130 and calculates the weight of the individual inverse function for each of the PAs 160 (step S201). Specifically, where the gain of the i-th PA 160 is "$G_i$", the weight $k_i$ of the individual inverse function regarding the PA 160 can be calculated by the following equation (4), for example.

$$k_i = \frac{G_i}{\sum_{i=1}^{M} G_i} \qquad (4)$$

That is, the weights corresponding to the ratio of the gains of the M-pieces of PAs 160 are calculated. Note that the weights of the individual inverse functions do not need to be calculated in accordance with the ratio of the gains but may be calculated in accordance with the values of the power of the gains, for example. Regardless of how the weights of the PAs 160 are calculated, the sum of the weights of the individual inverse functions of the respective PAs 160 becomes "1" as described above.

When the weights of the individual inverse functions for the respective PAs 160 are calculated, the inverse function control unit 121 executes linear combination of the individual inverse functions of the respective PAs 160 (step S202). Specifically, as described in the equation (2), the individual inverse functions of the respective PAs 160 are weighted and added using the weights so as to derive the integrated inverse function for final distortion compensation. The integrated inverse function is set in the distortion compensation unit 123, and the distortion of the transmission baseband signals thereafter is compensated by the integrated inverse function (step S203). That is, the distortion compensation coefficients read out from the lookup table regarding the PAs 160 are linearly combined and given to the transmission baseband signals, and the distortion compensated signals are calculated from the transmission baseband signals by a polynomial acquired by linearly combining polynomials regarding the PAs 160.

The distortion compensated signals acquired by distortion compensation are D/A converted and upconverted, and beamforming is performed by the BF processing unit 150 for giving the antenna weights to the signals of the respective antenna elements (step S204). Then, the signals of the antenna elements are amplified by the PAs 160 of the respective antenna elements (step S205), and transmitted from the antenna elements (step S206). Nonlinear distortion is generated in the signals of the antenna elements at the time of amplification performed in the PAs 160. However, since distortion compensation of the transmission baseband signals is executed by the distortion compensation unit 123, nonlinear distortion of radio signals emitted from the antenna elements is suppressed so that ACLR is sufficiently suppressed. Furthermore, since the integrated inverse function for distortion compensation acquired by linearly combining the individual inverse functions regarding the respective PAs 160 is used for the distortion compensation, it is possible to uniformly suppress the nonlinear distortion in the output of each of the PAs 160 so that ACLR of the entire PAs 160 can be reduced to the maximum extent.

Figure 5:
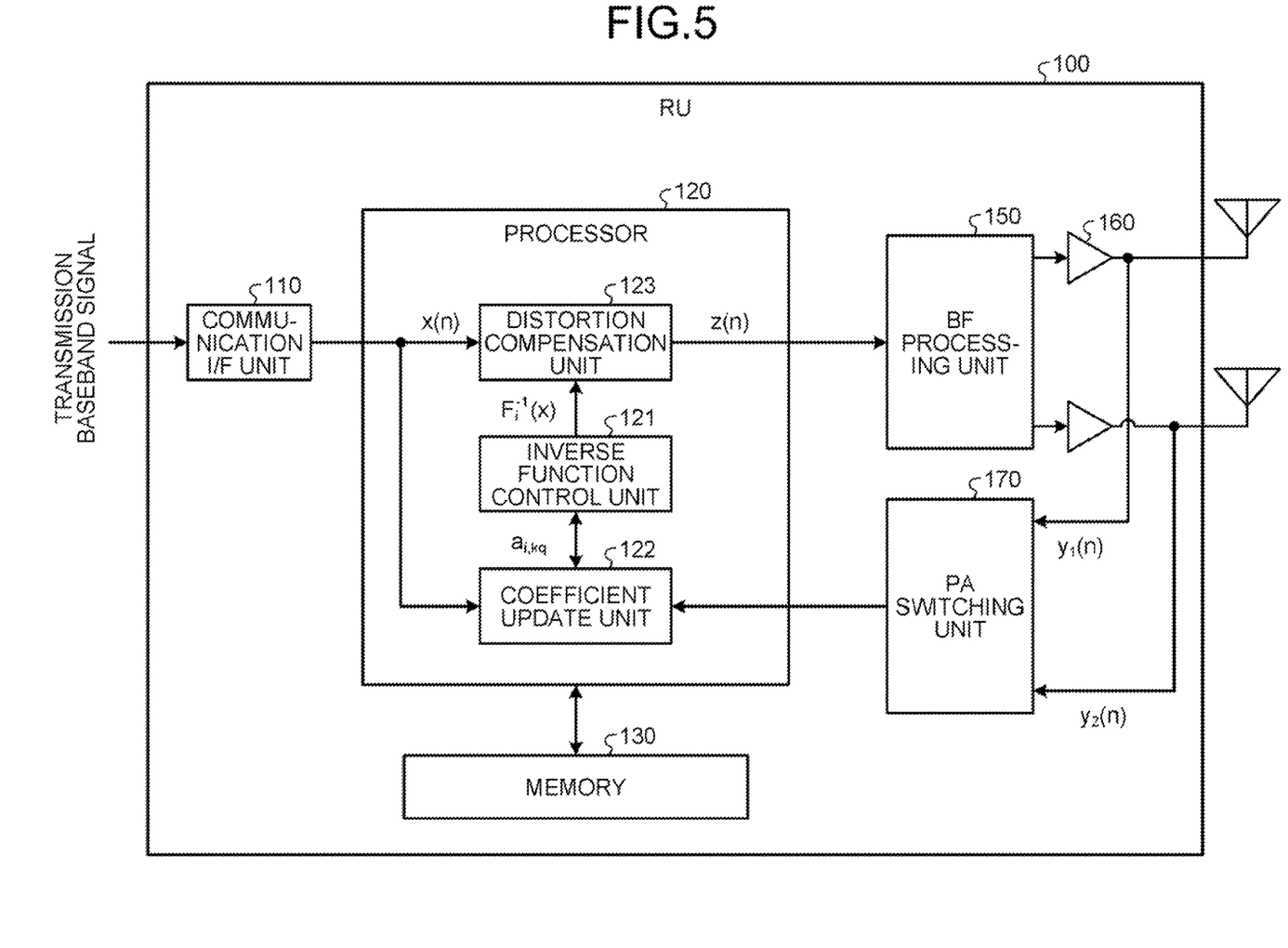
FIG. 5 is a diagram for describing signals that are input and output.

Next, a specific example related to update of the coefficients in the learning mode will be described. FIG. 5 is a diagram for describing the signals that are input and output to/from the processing blocks in the learning mode. While a case when the number of antenna elements (the number of PAs 160) is two is described herein as an example, the same applies to a case when the number of the antenna elements (the number of PAs 160) is three or more.

As illustrated in FIG. 5, when the transmission baseband signal x(n) at the discrete time "n" is input to the distortion compensation unit 123, the distortion of the transmission baseband signal x(n) is compensated and a distortion compensated signal z(n) is output. The distortion compensated signal z(n) is branched to the signals for the two antenna elements, amplified in the PAs 160 provided to the respective antenna elements, and fed back to the PA switching unit 170. That is, a feedback signal $y_1(n)$ is fed back to the PA switching unit 170 from the first PA 160, and a feedback signal $y_2(n)$ is fed back to the PA switching unit 170 from the second PA 160.

In the leaning mode, first, the inverse function control unit 121 sets the individual inverse function "$F_1^{-1}(x)$" regarding the first PA 160 in the distortion compensation unit 123. Furthermore, the PA switching unit 170 performs switching such that the feedback signal $y_1(n)$ from the first PA 160 is output to the coefficient update unit 122.

In the learning mode of the individual inverse function regarding the first PA 160, the distortion compensated signal $z_1(n)$ is expressed by the following equation (5).

$$z_1(n)=F_1^{-1}(x(n)) \quad (5)$$

The equation (5) is equivalent to the case where "1" is substituted for "i" in the equation (1). The distortion compensated signal $z_1(n)$ has the nonlinear distortion given thereto when amplified by each of the PAs 160, and fed back to the PA switching unit 170 as the feedback signals $y_1(n)$ and $y_2(n)$. Then, the feedback signal $y_1(n)$ from the first PA 160 is output herein to the coefficient update unit 122.

In the coefficient update unit 122, the error $\varepsilon_1(n)$ between the transmission baseband signal x(n) and the feedback signal $y_1(n)$ is calculated as in the following equation (6).

$$\varepsilon_1(n)=x(n)-y_1(n) \quad (6)$$

Then, the coefficient "$a_{1,kq}$" of the individual inverse function "$F_1^{-1}(x)$" is updated by the following equation (7).

$$a_{1,kq}(j+1)=a_{1,kq}(j)+\mu_1 \cdot \varepsilon_1(n) \cdot x^*(n) \quad (7)$$

When the coefficient "$a_{1,kq}$" is updated, the individual inverse function "$F_1^{-1}(x)$" is also updated. Therefore, the inverse function control unit 121 sets the updated individual inverse function "$F_1^{-1}(x)$" in the distortion compensation unit 123. Thereby, distortion of the transmission baseband signal x(n) is compensated by the updated individual inverse function "$F_1^{-1}(x)$".

When the update of the coefficient "$a_{1,kq}$" of the individual inverse function "$F_1^{-1}(x)$" regarding the first PA 160 described above is repeated for a prescribed time, the inverse function control unit 121 then sets the individual inverse function "$F_2^{-1}(x)$" regarding the second PA 160 in the distortion compensation unit 123. Furthermore, the PA switching unit 170 performs switching such that the feedback signal $y_2(n)$ from the second PA 160 is output to the coefficient update unit 122.

In the learning mode of the individual inverse function regarding the second PA 160, the distortion compensated signal $z_2(n)$ is expressed by the following equation (8).

$$z_2(n)=F_2^{-1}(x(n)) \quad (8)$$

The equation (8) is equivalent to the case where "2" is substituted for "i" in the equation (1). The distortion compensated signal $z_2(n)$ has the nonlinear distortion given thereto when amplified by each of the PAs 160, and fed back to the PA switching unit 170 as the feedback signals $y_1(n)$ and $y_2(n)$. Then, the feedback signal $y_2(n)$ from the second PA 160 is output herein to the coefficient update unit 122.

In the coefficient update unit 122, the error $\varepsilon_2(n)$ between the transmission baseband signal x(n) and the feedback signal $y_2(n)$ is calculated as in the following equation (9).

$$\varepsilon_2(n)=x(n)-y_2(n) \quad (9)$$

Then, the coefficient "$a_{2,kq}$" of the individual inverse function "$F_2^{-1}(x)$" is updated by the following equation (10).

$$a_{2,kq}(j+1)=a_{2,kq}(j)+\mu_2 \cdot \varepsilon_2(n) \cdot x^*(n) \quad (10)$$

When the coefficient "$a_{2,kq}$" is updated, the individual inverse function "$F_2^{-1}(x)$" is also updated. Therefore, the inverse function control unit 121 sets the updated individual inverse function "$F_2^{-1}(x)$" in the distortion compensation unit 123. Thereby, distortion of the transmission baseband signal x(n) is compensated by the updated individual inverse function "$F_2^{-1}(x)$".

When the update of the coefficient "$a_{2,kq}$" of the individual inverse function "$F_2^{-1}(x)$" regarding the second PA 160 described above is repeated for a prescribed time, update of the coefficients of the individual inverse functions regarding all of the PAs 160 is completed. Thereby, the learning mode is ended.

As described, in the learning mode, the PA 160 as the output source of the feedback signal is fixed to update the coefficient of the individual inverse function regarding that PA 160. Therefore, there is no issues generated regarding a phase difference, a delay time difference, and a gain difference between the feedback signals of the antenna elements, and the individual inverse functions of the respective PAs 160 can be calculated with high accuracy.

Furthermore, in the linear combination mode, the integrated inverse function is derived by performing weighted addition of the individual inverse functions of the respective PAs 160. Therefore, it is possible to uniformly suppress the nonlinear distortion generated in each of the PAs 160 without executing distortion compensation biased to one of the PAs 160.

As described above, according to the embodiment, the coefficients of the individual inverse functions of the respective PAs are updated in the learning mode, and update of the coefficients is suspended and the integrated inverse function for distortion compensation is derived by linearly combining the individual inverse functions of the respective PAs in the linear combination mode to execute the distortion compensation of the transmission signals by using the integrated inverse function. Therefore, it is possible to uniformly suppress the nonlinear distortion generated in each of the power amplifiers and sufficiently suppress ACLR in all of the power amplifiers. In other words, the nonlinear distortion generated in the power amplifiers provided to the respective antenna elements can be sufficiently compensated.

While the case where the RU 100 performs analog beamforming is described in the embodiment above, the distortion compensation according to the embodiment is also applicable to a case where the RU 100 performs hybrid beamforming. That is, when collectively applying digital predistortion to each of subarrays having the antenna elements, the same distortion compensation as that of the embodiment may be executed for each of the subarrays.

Furthermore, the embodiment described above may also be configured to shift back to the learning mode again when a prescribed time has passed after shifting to the linear combination mode. This makes it possible to regularly update the coefficients of the individual inverse functions so as to compensate the nonlinear distortion that fluctuates in accordance with the environment such as temperatures.

According to one aspect of the wireless communication device and the compensation method disclosed in the present application, it is possible to sufficiently compensate the nonlinear distortion generated in the power amplifiers provided to the respective antenna elements.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
a plurality of power amplifiers provided for a plurality of respective antenna elements, each of the power amplifiers amplifying a signal;
a distortion compensation unit that executes distortion compensation of a transmission signal by using an inverse function corresponding to nonlinear distortion generated in the power amplifiers; and
a controller that operates by switching a first mode and a second mode, the first mode setting individual inverse functions for the respective power amplifiers in the distortion compensation unit and updating coefficients of the individual inverse functions, the second mode suspending the update of the coefficients of the individual inverse functions and setting, in the distortion compensation unit, an integrated inverse function acquired by performing weighted addition of the individual inverse functions.

2. The wireless communication device according to claim 1, further comprising a feedback unit that feeds back a signal output from one of the power amplifiers to the controller, when the controller operates in the first mode.

3. The wireless communication device according to claim 1, wherein, in the first mode, the controller updates the coefficients of the individual inverse functions for the respective power amplifiers, for a predetermined time each.

4. The wireless communication device according to claim 1, wherein, in the first mode, the controller shifts to the second mode when the update of the coefficients of the individual inverse functions regarding all of the power amplifiers is completed.

5. The wireless communication device according to claim 1, wherein, in the second mode, the controller calculates weights of the respective power amplifiers in accordance with gains of the respective power amplifiers, and performs weighted addition of the individual inverse functions of the respective power amplifiers using the calculated weights to derive the integrated inverse function.

6. The wireless communication device according to claim 5, wherein the controller calculates the weights of the respective power amplifiers to make a sum of the weights of the power amplifiers "1".

7. A distortion compensation method executed by a wireless communication device including: a plurality of power amplifiers provided for a plurality of respective antenna elements, each of the power amplifiers amplifying a signal; and a distortion compensation unit that executes distortion compensation of a transmission signal by using an inverse function corresponding to nonlinear distortion generated in the power amplifiers, the distortion compensation method comprising:
operating in a first mode that sets individual inverse functions for the respective power amplifiers in the distortion compensation unit, and updates coefficients of the individual inverse functions; and
operating in a second mode that suspends the update of the coefficients of the individual inverse functions and sets, in the distortion compensation unit, an integrated inverse function acquired by performing weighted addition of the individual inverse functions.

* * * * *